United States Patent

Renoulin

[15] 3,686,657

[45] Aug. 22, 1972

[54] DEVICE FOR DISTRIBUTING HIGH-SAFETY TIME BASES

[72] Inventor: Roger Renoulin, Ernee, France

[73] Assignee: Societe Lannionnaise D'Electronique, Lannion, France

[22] Filed: Feb. 26, 1971

[21] Appl. No.: 119,256

[30] Foreign Application Priority Data

Feb. 27, 1970 France......................7007201

[52] U.S. Cl................340/248 A, 307/235, 328/116, 328/147, 328/157

[51] Int. Cl..........................G08b 23/00, H03k 19/42

[58] Field of Search.......340/248 A, 248 P; 328/157, 328/158, 146, 147, 148, 116, 117; 307/232, 235

[56] References Cited

UNITED STATES PATENTS 3,289,193 11/1966 Worthington et al..340/248 A 3,431,557 3/1969 Thomas et al......340/248 A X 3,467,956 9/1969 Moreines...........340/248 A X 3,473,151 10/1969 Moreines et al........340/248 P 3,566,283 2/1971 Diebler..................307/235 X 3,591,785 7/1971 Miller........................328/158

*Primary Examiner*—John W. Caldwell

*Assistant Examiner*—Scott F. Partridge

*Attorney*—Craig, Antonelli & Hill

[57] ABSTRACT

The invention pertains to the field of high-reliability time bases which are indispensable in certain installations for the processing of information for which no breakdown or malfunction can be tolerated and which comprise for this reason a combination of several generators of clock signals and a circuit producing a majority decision concerning the several signals generated to provide a corrected signal which can be compared to the output of each generator.

9 Claims, 4 Drawing Figures

INVENTOR

ROGER RENOULIN

BY Craig, Antonelli, Stewart & Hill
ATTORNEYS

DEVICE FOR DISTRIBUTING HIGH-SAFETY TIME BASES

The present invention pertains to the field of high-reliability time bases which are indispensable in certain installations for the processing of information in which no breakdown or malfunction can be tolerated and which, for this reason, comprise or include a combination of several generators of clock signals which are subjected to strict controls. More particularly, the invention is directed to a simplification of the control system, which leads to a significant economic saving. The principal application or use proposed by the present invention is in an automatic time switch for telephone switching systems.

In certain installations for processing information, for example, an automatic time switch, it is indispensable that the distribution of the clock signals be assured with a very high degree of reliability and precision.

For this reason, it is known to use in combination a group or unit of three generators of clock signals, or time bases, associated with a control device to insure reliable operation thereof. The output signals of the three generators Nos. 1, 2 and 3 are applied to three analog summation circuits having three inputs each. A first comparator compares the output signal of the first summation circuit with that of the generator No. 1; a second comparator compares the output signal of the second summation circuit with that of the generator No. 2; and a third comparator compares the output signal of the third summation circuit with that of the generator No. 3. If one of the comparators finds a disparity, it emits an alarm.

Each summation circuit applies its output signal to a direct current output amplifier $S_1$ and, by way of an inverter, to an inverted output amplifier $\overline{S_1}$ . The direct signal and the inverted signal are applied to two inputs of a first control. Likewise, the direct signal and the inverted signal of the amplifiers of the second channel, $S_2$ and $\overline{S_2}$, are applied to two inputs of a second control; and the direct signal and the inverted signal of a third channel, $S_3$ and $\overline{S_3}$, are applied to two inputs of a third control.

The outputs of the three direct output amplifiers are connected through three resistors respectively and furnish a direct output terminal A, and the outputs of the three inverted output amplifiers are connected through three resistors respectively and furnish an inverted output terminal $\overline{A}$. The two terminals A and $\overline{A}$ are connected with two inputs of a threshold receiver whose outputs are simultaneous applied to two terminals of the first, second and third controls, respectively. If there is no correspondence between the signals, the control which is respectively concerned or affected emits an alarm.

It is readily apparent that the conventional unit comprises, in addition to the threshold receiver and the distributing amplifiers, three comparators, three summation circuits, and three controls. It is therefore a relatively complex unit.

The present invention provides for a much simpler and more economical solution to the problem at hand which renders it possible to arrive at a control having the same effectiveness, yet one with much less complexity.

The principle of the present invention consists in deleting the input controls and in keeping the output controls, combined with a threshold receiver which has now become a summation threshold receiver, in other words, a circuit which operates as a function of the accumulated amplitude of at least two of the three signals.

The present invention will now be described hereinafter in further detail, taken in connection with the accompanying drawing, wherein.

Figure 1:
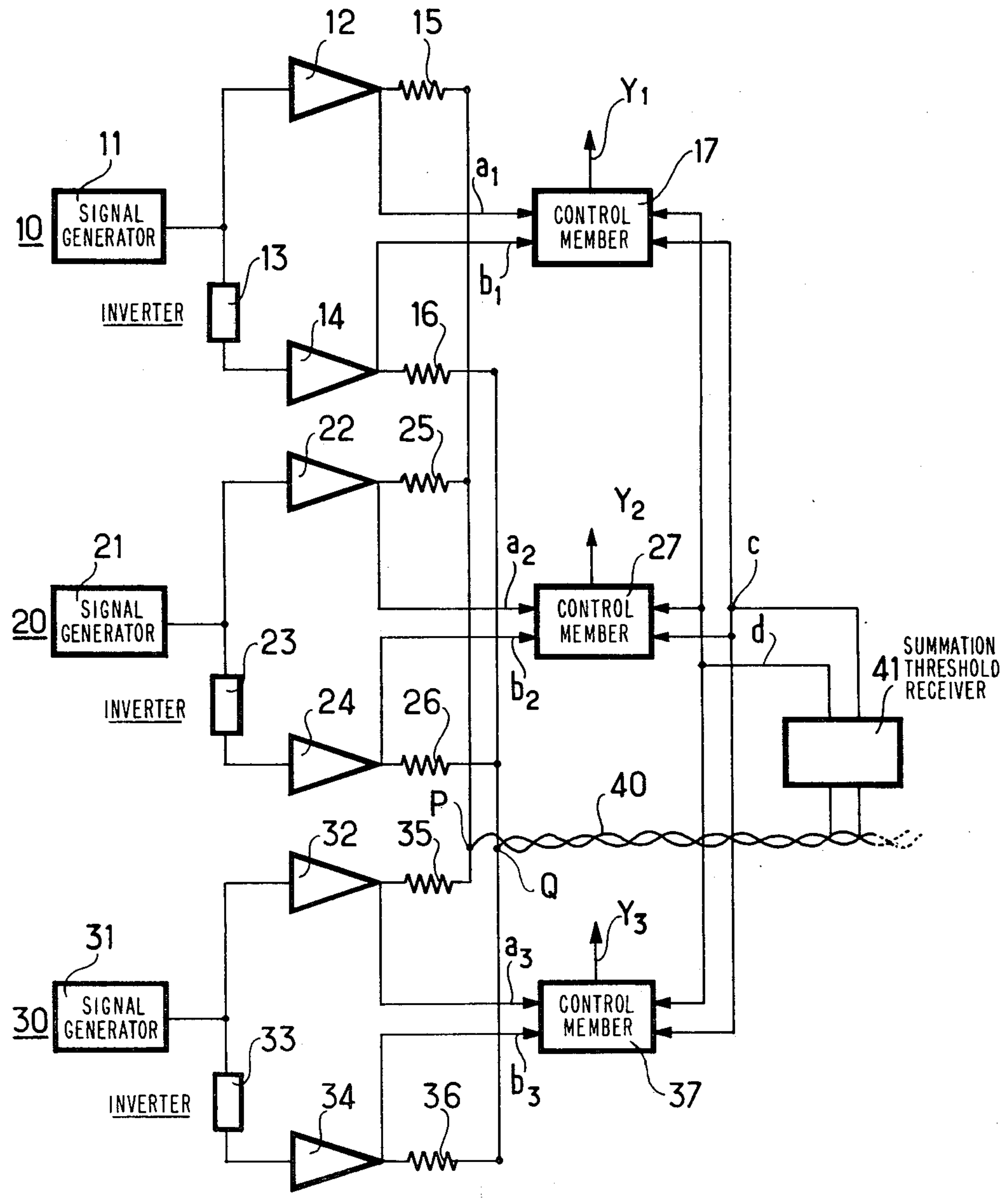
FIG. 1 is a schematic block diagram of one embodiment of the apparatus proposed by the present invention.

FIG. 1 shows one example of a system according to the present invention. It comprises three identical channels, 10, 20 and 30. The channel identified as 10, for example, contains a clock signal generator 11 connected on the one hand to a DC amplifier 12 and on the other hand to an inverter 13 connected to the input of a further DC amplifier 14 for amplifying the direct and inverted signals, respectively. From the amplifier 12, there issues a signal $a_1$ and from the amplifier 14, there issues a signal $b_1$, the signals $a_1$ and $b_1$ being applied to respective inputs of a control member 17.

The channels 20 and 30 are made up in the same manner and are provided with similar reference numerals for corresponding elements in channel 10; however, the respective reference numerals in channels 20 and 30 has been replaced by 2 and 3, respectively.

The output currents of the amplifiers 12, 22 and 32 are applied to point P through three uncoupling resistors 14, 25, and 35, respectively, where they are added; and the output currents of the amplifiers 14, 24 and 34 are applied to point Q through three uncoupling resistors 16, 26 and 36, respectively, where they are added.

Connected to points P and Q is a bifilar line 40 which supplies the inputs of a summation threshold receiver 41. From this receiver issue two complementary signals c and d representing the majority decision which are simultaneously applied to the two inputs of the control members 17, 27 and 37, respectively. In case of malfunction of one of the three generators 11, 21 or 31, an alarm signal $Y_1$, $Y_2$ or $Y_3$ issues from one of the control members 17, 27 or 37, depending on which channel is producing the incorrect signal.

Figure 2:
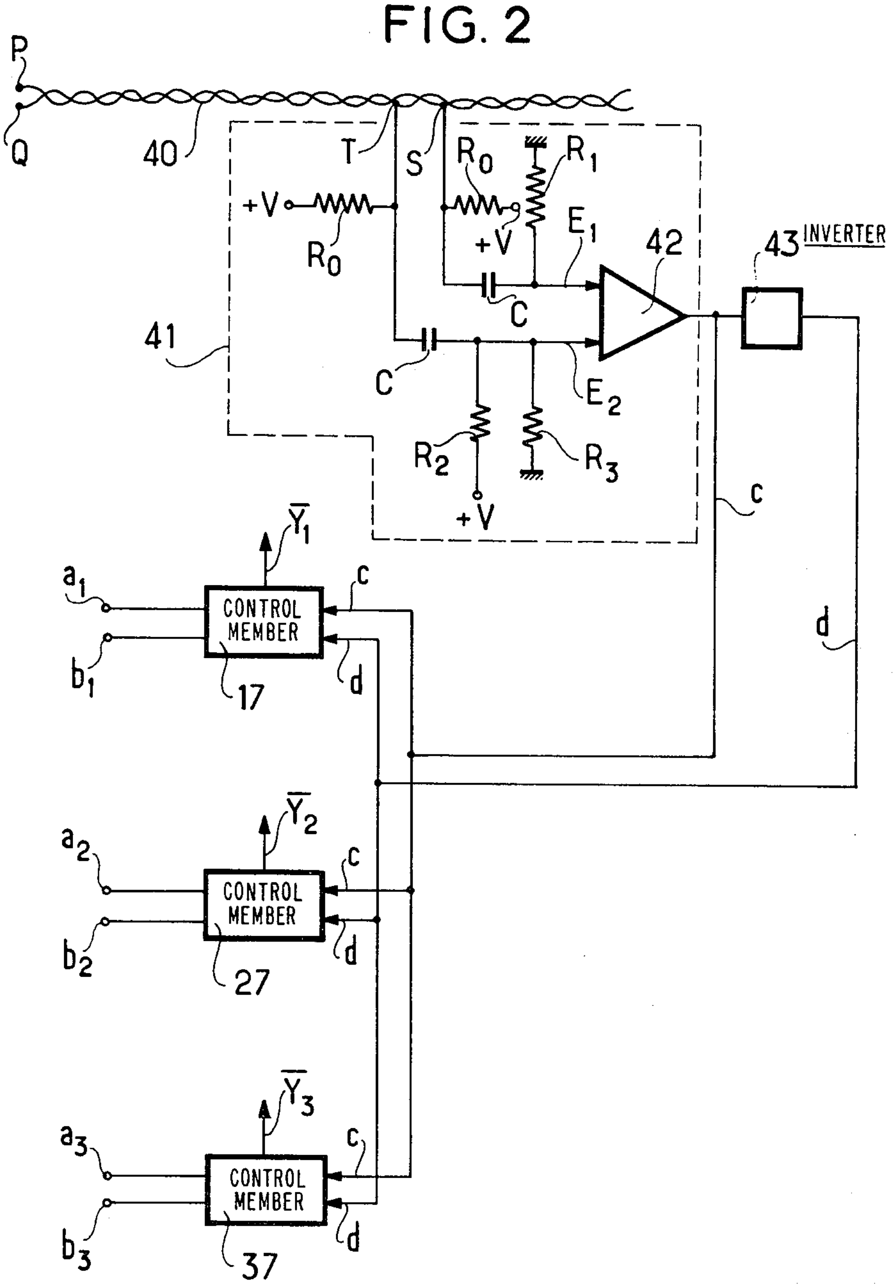
FIG. 2 is more detailed diagram of the threshold receiver as connected in the system shown in Fig. 1.

FIG. 2 is a more detailed diagram of the control portion of the increasing threshold receiver 41, shown in FIG. 1. The bifilar line 40 originating at points P and Q is connected at points S and T to the input of the summation threshold receiver 41 which comprises a differential amplifier 42 having inputs $E_1$ and $E_2$ and an output connected to an inverter 43, as well as an input threshold adjusting circuit. Two equal looping resistors $R_0$ and $R'_0$ are connected preferably between the conductors of the bifilar line 40 and a voltage +V for effecting proper biasing of the amplifier. Two capacitors C and C′ are also provided, one connected in series between point S and input $E_1$ and the other connected in series between point T and input $E_2$.

A resistor $R_1$ is connected between input $E_1$and ground and a resistor $R_2$ is connected between input $E_2$ and +V; while, a resistor $R_3$ is connected between input $E_2$ and ground.

When the resistors $R_0$ and $R_0'$ are in the order of several tens of ohms, the resistors $R_1$, $R_2$ and $R_3$ being generally of different values, are preferably greater than 10 kΩ. The adjustment of the threshold resistance network makes it possible to adapt this network to any desired cyclic ratio.

The basic function of the receiver 41 in accordance with the present invention is to produce a signal at the output thereof which corresponds to at least two of the generated clock signals, it being assumed that a malfunction will occur in practice only in a single generator at one time. This is accomplished within the receiver by shifting the threshold level of the sum signal formed from the three generated clock signals by one level so that only two levels of the sum signal are considered. This provides a majority decision in connection with the three generated clock signals, as will be described in more detail herein-after in connection with FIG. 4.

From the differential amplifier 42 issues a signal *c*, and from the inverter 43, there issues the inverted signal *d*, which signals represent the majority decision in connection with the three clock signals. These signals are simultaneously applied to the two inputs of the control members 17, 27 and 37, respectively. Each control member, for example, is a logical member which furnishes the function $\overline{Y}_1=\overline{a}_1d+\overline{b}_1c+d\,\overline{b}_1+a_1c$. One would have symmetrically $\overline{Y}_2$ and $\overline{Y}_3$ at the output of control members 27 and 37, respectively. Thus, the control members merely include suitable logic gates to compare the values which are applied thereto from the receiver 41 on the one hand and from the respective clock generator on the other hand to detect correspondence or lack thereof between the signals. Any error in the signals on lines $a_i$ or $b_i$ is detected by lack of coincidence with the signals *c* and *d* from the receiver, which will be certainly correct, since they result from a majority decision, unless a malfunction occurs in more than one generator at a time. In the latter case, an alarm will be sounded from all three channels.

Figure 3:
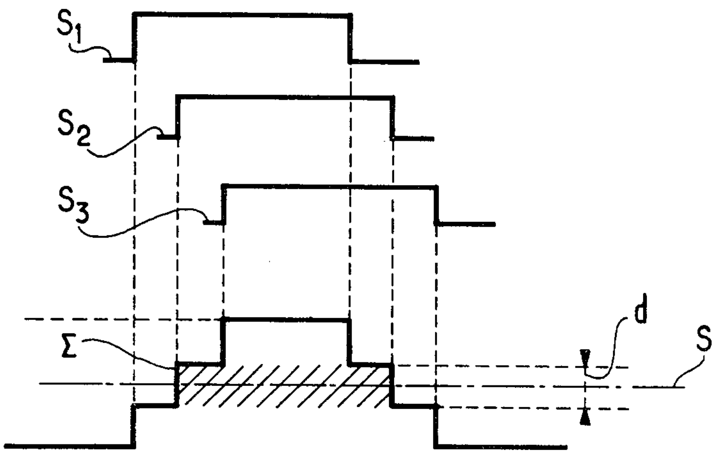
FIG. 3 is a waveform diagram designed to explain the principle of operation of the increasing threshold.

FIG. 3 shows by way of example the positioning of the resulting threshold in the case of three clock signals $S_1$, $S_2$ and $S_3$ being slightly offset in phase. The curve Σ indicates the sum of the three signals $S_1$, $S_2$ and $S_3$. On curve Σ there has been shown at d a step which represents the majority decision derived from the increasing threshold produced by the receiver 41 and at S the average threshold.

Figure 4:
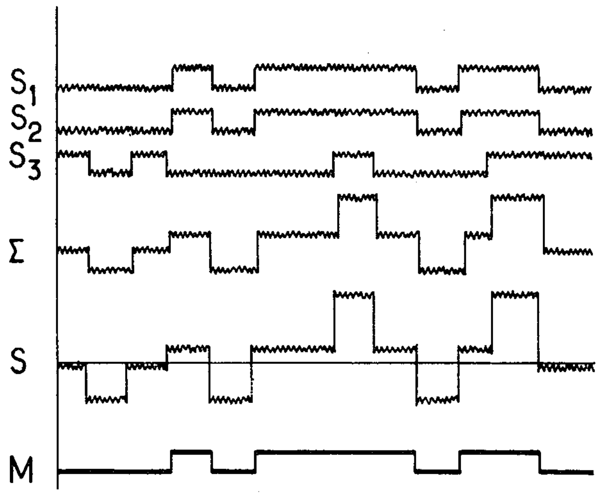
FIG. 4 shows oscillograms illustrating the operation of the device according to the present invention.

FIG. 4 is a reproduction of oscillograms showing in one example the effectiveness of the increasing threshold according to the present invention. It has been assumed that two of the signals $S_1$ and $S_2$ are correct but that the third one, $S_3$, is erroneous.

Curve Σ represents the sum of the line currents which is made up of three levels in view of the summation of three clock signals. By raising the threshold of the sum signal S by one level, the two levels which remain must correspond to two similar signals representing the majority decision. Thus, one finds at M the result of the majority decision, which faithfully reproduces one of the correct signals.

The present invention has been described with reference to clock signals but it could equally be applied to logical signals generally. The number of generators could be other than three without departing from the spirit and scope of the present invention.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A device for generating signals with high reliability comprising a plurality of identical signal generators, each generating identical signals in synchronism, amplifier means connected to the output of each signal generator for producing a direct signal and inverted signal from the output of each signal generator, majority decision receiver means having a first input receiving the sum of said direct signals and a second input receiving the sum of said inverted signals for generating a first direct signal and a second inverted signal corresponding to a majority decision of the out puts of said plurality of signal generators, and an individual control circuit connected to each of said amplifier means and to said majority decision receiver means for logically comparing said first and second signals from said majority decision receiver means with said direct and inverted signals from the respective amplifier means.

2. A device for generating signals as defined in claim 1, wherein said majority decision receiver means includes a differential amplifier having first and second inputs, said first input being connected through a first capacitor to a summing point for the direct signal outputs of all of said amplifier means and said second input being connected through a second capacitor to a summing point for the inverted signal outputs of all of said amplifier means, a first resistance connected between one of said inputs of said differential amplifier and ground, and a second resistance connected between the other input of said differential amplifier and a source of voltage.

3. A device for generating signals as defined in claim 1, wherein said control means includes alarm signal generating means responsive to detection of lack of correspondence between said first and second signals from said majority decision receiver and said direct and inverted signals from the respective amplifier means, respectively.

4. A device for generating signals as defined in claim 1, wherein said majority decision receiver means includes means responsive only to a minimum signal level equal to the output level of a single signal generator.

5. A device for generating signals as defined in claim 4, wherein said control means includes alarm signal generating means responsive to detection of lack of correspondence between said first and second signals from said majority decision receiver and said direct and inverted signals from the respective amplifier means, respectively.

6. A device for generating signals as defined in claim 5, wherein said majority decision receiver means includes a differential amplifier having first and second inputs, said first input being connected through a first capacitor to a summing point for the direct signal outputs of all of said amplifier means and said second input being connected through a second capacitor to a summing point for the inverted signal outputs of all of said amplifier means, a first resistance connected between one of said inputs of said differential amplifier and ground, and a second resistance connected between the other input of said differential amplifier and a source of voltage.

7. A device for generating signals with high reliability comprising a plurality of signal generators each generating in synchronism identical signals having a first reference level and a second level, summing means for summing the outputs of said plurality of signal generators, Majority decision receiver means connected to said summing means and responsive only to a minimum signal level equal to said second level for generating an output signal equal to the majority decision of the summed outputs of said plurality of signal generators, and individual control means connected to a respective signal generator and the output of said majority decision receiver means for generating an alarm signal when said majority decision output signal does not correspond to the signal generated by a respective signal generator.

8. A device for generating signals as defined in claim 7, wherein each of said individual control means includes comparison means for comparing the output of the generator to which said control means is connected to said majority decision output signal.

9. A device for generating signals as defined in claim 8, wherein said majority decision receiver means includes a differential amplifier having first and second inputs, said first input being connected through a first capacitor to a summing point for the direct signal outputs of all of said amplifier means and said second input being connected through a second capacitor to a summing point for the inverted signal outputs of all of said amplifier means, a first resistance connected between one of said outputs of said differential amplifier and ground, and a second resistance connected between the other input of said differential amplifier and a source of voltage.

* * * * *